Feb. 26, 1924.
L. P. DESTRIBATS
1,485,170
METHOD OF MAKING PNEUMATIC TIRES
Filed June 17, 1920
Fig.1.
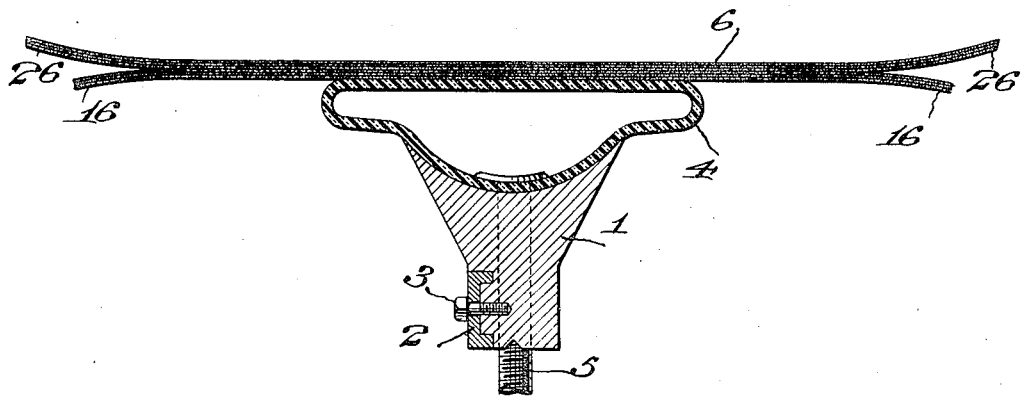
Fig.2.
Fig.3.
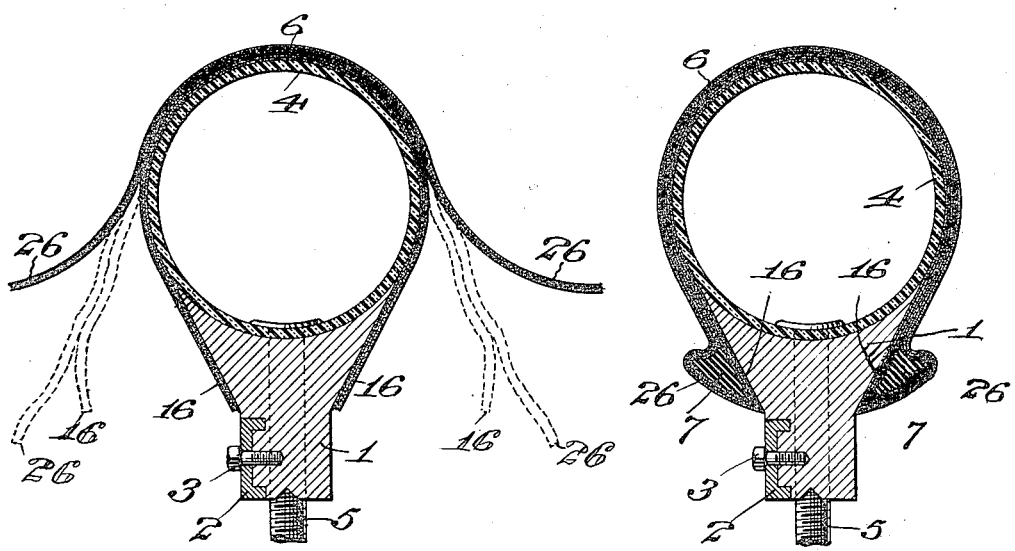
Inventor:
Louis P. Destribats
by his attorneys Patented Feb. 26, 1924.

1,485,170

UNITED STATES PATENT OFFICE.

LOUIS P. DESTRIBATS, OF TRENTON, NEW JERSEY.

METHOD OF MAKING PNEUMATIC TIRES.

Application filed June 17, 1920. Serial No. 389,665.

*To all whom it may concern:*

Be it known that I, LOUIS P. DESTRIBATS, a citizen of France, and resident of Trenton, in the county of Mercer and State of New Jersey, have invented a new and useful Improvement in Methods of Making Pneumatic Tires, of which the following is a specification.

This invention relates to a method of making pneumatic tires, and more particularly the outer shoe or casing of an automobile tire, and has for an object to provide such a method in which the fabric composing the tire carcass may be built or formed in the shape of a flat annular band, then placed upon the apparatus on which it is to be built and distorted partially into its designed shape by the action of the said apparatus.

Another object is to provide such a method in which use is made of the apparatus on which the carcass is built, which apparatus is collapsible and expansible by fluid means, whereby the fabric band may be placed upon the apparatus in its collapsed condition and partially distorted to its designed shape by the expansion of the said apparatus.

Another object consists in providing such a method in which the fabric band is made of a diameter approximately equal to the median diameter of the completed tire; the central portion of the fabric band being distorted into its designed shape by the expansion of the said apparatus, and the edges of the fabric being distorted into their designed shape by the use of suitable devices pressing the said edges into contact with the said apparatus.

Another object consists in providing certain improvements in the manner of executing the steps of the process and in the form, construction and arrangement of the apparatus employed, whereby the above named and other objects may be effectively attained.

A practical embodiment of the invention is represented in the accompanying drawings, in which, Fig. 1 represents a sectional view showing the fabric band and apparatus in an initial stage.

Fig. 2 represents a similar view showing the fabric band partially distorted into its designed shape, different positions being shown in full and dotted lines.

Fig. 3 represents a similar view showing the completed tire carcass, including the beads.

The apparatus employed in carrying out my method includes an annulus denoted by 1 which is, in shape, substantially like the inner portion of an ordinary core ring upon which these tire casings are customarily built and vulcanized. This annulus is preferably composed of separate metallic sections in order to make the same collapsible, which sections are held in ring formation by a suitable clamping ring 2 that is attached to the several sections by cap screws 3. The manner of making an annulus of this character in sections and securing the said sections in this ring-like form is well understood by operatives in this industry and will not be further described herein.

The outer periphery of the annulus 1 is concaved in order to provide a seat for an air-bag 4. This air-bag may be composed of a suitable rubber and fabric composition, and is substantially like an ordinary inner tube of a pneumatic automobile tire. It has a valve 5, of customary form, which passes through a suitable hole in one of the sections of the annulus. It will be readily understood that the air-bag 4 may be expanded or collapsed by the injection or ejection of air through the valve 5 in an obvious manner.

In building the tire carcass I employ the customary strips of fabric, such as duck of a suitable weight, which strips are preferably cut on the bias and impregnated or coated, or both impregnated and coated, with a suitable vulcanizable rubber compound, all as is well understood in this industry.

An appropriate number of these strips of treated fabric are formed into an endless flat band with the strips closely adhering to each other, as represented at 6 in Fig. 1. Preferably the outer strips or layers are somewhat wider than the inner ones, for the reason that the former have to surround the beads to be incorporated in the tire; and I keep the wider strips separate from the narrower strips at both edges of the band as indicated in Fig. 1, by inserting between the inner and outer strips, at the said edges, some anti-adherent such as soap stone powder or ribbons of plain fabric, such as muslin, in order to enable the ready separation of the said inner and outer strips at the edges of the band.

The band thus formed should be of a diameter about equal to the median diameter of the tire to be built, and it is placed on the annulus 1 and air-bag 4, while the latter is collapsed, the relative position of the parts being shown in Fig. 1.

With the parts in this position the air-bag 4 is inflated so as to greatly increase its outer diameter, which action stretches the central portion of the fabric band 6 and causes it to conform to the outer part of the inflated air-bag, while the edges of the band project inwardly and laterally from the sides of the said air-bag as shown in dotted lines in Fig. 2. This stretching or distorting action takes place with substantial uniformity throughout the various parts of the central portion of the fabric band and serves to appropriately rearrange the threads of the fabric so as to enable the latter to accurately conform to the adjacent part of the air-bag; while the fluid or pneumatic pressure within the air-bag imparts to the said portion of the band substantially that tension which will be given to it when the tire is inflated for use on a vehicle.

The next step is to form the edges of the narrower strips, denoted by 16, down against the sides of the air-bag 4 and annulus 1, as clearly shown in Fig. 2. This operation may be performed by the use of the ordinary devices, such as stitching rollers, which are familiar to workmen in this art.

Following this, the wider strips of the band 6, which are marked 26, are separated still further from the strips 16, as shown in Fig. 2. The beads 7, which may be of the ordinary form and construction, are now set in place at the inner edges of the strips 16, in any well known or approved manner. Then the strips 26 are formed down against the strips 16 and around the beads, by the use of the ordinary stitching roller or other suitable device; after which the edges of the strips may be trimmed in the ordinary manner, and the carcass is complete, as shown in Fig. 3.

In case ribbons of ordinary fabric, such as muslin, are placed between the strips 16 and 26 at the edges of the fabric band, as mentioned above, the same will be removed just prior to forming the edges of the strips 16 down against the sides of the air-bag and annulus; while, if an agent such as soap stone powder is employed, the same will be removed or its effect neutralized by the application of vulcanizable rubber cement, before the beads are set in place.

It will be seen that, as a result of this process, the greater part of the stretching or distortion of the fabric takes place under conditions which are calculated to produce the most uniformity and accuracy with the least chance of injury and the least amount of labor. Inasmuch as the fabric band is originally formed of a diameter about equal to the median diameter of the tire to be made, the subsequent distortion of the fabric is distributed about equally between its central portion and its edges, the former being stretched and the latter contracted or condensed as is required in order to make the fabric assume the desired shape.

It will of course be clear that, during the formation of the tire, the annulus and air-bag carried thereby are conveniently mounted upon a spider or what is known in this art as a making up stand, so that the work is convenient to the hand of the operator and may be turned to any position desired.

After the carcass has been constructed as described, the tire may be completed in the usual manner. Before vulcanization, I prefer to remove the annulus and air-bag, which is easily accomplished owing to the collapsible nature of these parts, and to substitute therefor a rim and air-bag such as are commonly used for the vulcanizing step, as is well understood.

It will be understood that various changes may be resorted to in the form, construction and arrangement of the apparatus and in the manner of carrying out the steps of the method without departing from the spirit and scope of my invention; and hence I do not wish to be limited to the details herein shown and described except as they may be included in the claims.

What I claim is:—

1. A method of making tires which includes the following steps: first, forming an endless fabric band composed of a plurality of layers; second, placing said band on an expansible annulus; third, expanding said annulus to shape the central portion of the band; fourth, shaping the edges of the inner layers of the band to the sides of the annulus; fifth, placing beads on the last named layers; and sixth, shaping the edges of the remaining layers to the sides of the annulus and to the beads.

2. A method of making tires which includes the following steps: first, forming an endless fabric band composed of a plurality of layers and of a diameter substantially equal to the median diameter of the tire to be made; second, placing said band on an expansible annulus; third, expanding said annulus to shape the central portion of the band; fourth, shaping the edges of the inner layers of the band to the sides of the annulus; fifth, placing beads on the last named layers; and sixth, shaping the edges of the remaining layers to the sides of the annulus and to the beads.

3. A method of making tires which includes the following steps: first, forming an endless fabric band composed of a plurality of layers; second, placing said band on a fluid expansible annulus; third, inflating said annulus to shape the central portion of the band; fourth, shaping the edges of the inner layers of the band to the sides of the annulus; fifth, placing beads on the last named layers; and sixth, shaping the edges of the remaining layers to the sides of the annulus and to the beads.

4. A method of making tires which includes the following steps: first, forming an endless fabric band composed of a plurality of layers and of a diameter substantially equal to the median diameter of the tire to be made; second, placing said band on a fluid expansible annulus; third, inflating said annulus to shape the central portion of the band; fourth, shaping the edges of the inner layers of the band to the sides of the annulus; fifth, placing beads on the last named layers; and sixth, shaping the edges of the remaining layers to the sides of the annulus and to the beads.

In testimony, that I claim the foregoing as my invention, I have signed my name, this 10th day of June 1920.

LOUIS P. DESTRIBATS.